United States Patent [19]
Hsu et al.

[11] Patent Number: 6,084,033
[45] Date of Patent: Jul. 4, 2000

[54] BIMETALLIC COMPLEX CATALYST SYSTEMS, THEIR PREPARATIONS AND APPLICATION IN THE HYDROGENATION OF UNSATURATED COPOLYMERS

[75] Inventors: Kuei-Hsien Hsu, Kaohsiung Hsien, Taiwan; Guanying Wu, Beijing, China; Ruiqing Xu, Beijing, China; Dongmei Yue, Beijing, China; Shuqin Zhou, Beijing, China

[73] Assignee: Nantex Industry Co., Ltd., Taiwan

[21] Appl. No.: 09/074,586

[22] Filed: May 8, 1998

[30] Foreign Application Priority Data

May 8, 1997 [CN] China .................................... 97110896

[51] Int. Cl.$^7$ .................................................. C08F 8/04
[52] U.S. Cl. ........................ 525/338; 525/339; 556/14; 556/23; 556/28; 556/30; 556/31
[58] Field of Search .................................... 525/338, 339; 556/14, 23, 28, 30, 31

[56] References Cited

U.S. PATENT DOCUMENTS

| | | |
|---|---|---|
| 3,480,659 | 11/1969 | Dewhirst . |
| 3,700,637 | 10/1972 | Finch, Jr. . |
| 3,898,208 | 8/1975 | Krause . |
| 4,464,515 | 8/1984 | Rempel et al. . |
| 4,503,196 | 3/1985 | Rempel et al. . |
| 4,549,018 | 10/1985 | Siedle ...................................... 544/225 |
| 4,551,543 | 11/1985 | Doyle et al. .............................. 556/14 |
| 4,581,417 | 4/1986 | Buding et al. . |
| 4,631,315 | 12/1986 | Buding et al. . |
| 4,673,757 | 6/1987 | Fiedler et al. . |
| 4,746,707 | 5/1988 | Fiedler et al. . |
| 4,795,788 | 1/1989 | Himmler et al. . |
| 4,952,713 | 8/1990 | Lilga et al. ............................... 556/31 |
| 4,997,758 | 3/1991 | Kostic et al. ............................ 435/177 |
| 5,135,901 | 8/1992 | Beavers . |
| 5,200,539 | 4/1993 | Stanley et al. ............................ 556/21 |
| 5,223,631 | 6/1993 | Cheng et al. ............................ 549/535 |
| 5,360,939 | 11/1994 | Stanley et al. ............................ 556/21 |

FOREIGN PATENT DOCUMENTS

| | | |
|---|---|---|
| 0 405 266 A2 | 1/1991 | European Pat. Off. . |
| 0 455 154 A1 | 11/1991 | European Pat. Off. . |
| 64-51405 | 2/1989 | Japan . |
| 1 588 491 | 1/1980 | United Kingdom . |
| 2 070 023 | 9/1981 | United Kingdom . |

OTHER PUBLICATIONS

Determination Of The Degree Of Hydrogenation In Hydrogenated Nitrilebutadiene Rubber (HNBR); American Chemical Society, Oct. 17, 1989.

Tris (Triphenylphosphine) Halorhodium(I); by J.A. Osborn et al; Inorganic Syntheses; pp. 67–71; 1967.

Tetrakis (triphenylphospine) dichlororuthenium (II); by P.S. Hallman; Inorganic Syntheses; pp. 237–240; 1970.

People Republic of China National Standard Iodometric Determination of Plasticizers; GB 1676–81; Revised GB 1675–79; Jul. 1, 1982.

*Primary Examiner*—Bernard Lipman
*Attorney, Agent, or Firm*—Burns, Doane, Swecker & Mathis, L.L.P.

[57] ABSTRACT

The present invention relates to a new bimetallic complex catalyst system having the empirical formula of $M^1_a M^2_b X_m (L_1)_n$, wherein $M^1$ is Rh or Ru, $M^2$ is Ru or a lanthanide, when $M^1$ is Rh, $M^2$ is Ru or a lanthanide; when $M^1$ is Ru, $M^2$ is a lanthanide; X is H, Cl, Br or the combinations thereof; $L_1$ is the ligand to the metal salt; $1 \leq a \leq 4$; $1 \leq b \leq 2$; $3 \leq m \leq 6$; $6 \leq n \leq 15$. The present invention also relates to a corresponding improved process for the hydrogenation of unsaturated copolymers, particularly NBR type rubber, wherein the above mentioned new bimetallic complex catalyst system is used.

29 Claims, No Drawings

BIMETALLIC COMPLEX CATALYST SYSTEMS, THEIR PREPARATIONS AND APPLICATION IN THE HYDROGENATION OF UNSATURATED COPOLYMERS

FIELD OF THE INVENTION

The present invention relates to bimetallic complex catalyst systems, their preparation and their application in the hydrogenation of unsaturated copolymers, specifically NBR type rubber.

BACKGROUND OF THE INVENTION

Early in 1952, many processes for the selective hydrogenation of carbon-carbon double bond (C=C) in NBR were patented. By 1985, numerous patents such as U.S. Pat. Nos. 3,700,637; 3,898,208; 3,480,659; 4,464,515; 4,581,417; 4,503,196; GB 1,558,491; 2,070,023A mainly focused on organo-rhodium complexes, i.e. the so-called Wilkinsons catalysts, of which $RhCl(PPh_3)_3$ was the typical one. The characteristic of Rh-complexes as hydrogenation catalysts in high activity and high selectivity, while their drawback is high cost. Despite of its very small abundance ratio, rhodium is widely used in chemical industry; glass, ceramics and electrical applicance industries; and is an essential component in catalysts for the purification of exhaust gas from automobiles, which renders it very expensive. Since 1985, many patents were issued, which employed complexes of Ru-salts instead of those of Rh-salts as hydrogenation catalysts in order to reduce cost. They were described in U.S. Pat. Nos. 4,631,315; 4,673,757; 4,747,707; 4,795,788; EP 0,405,266A2; 0,455,154A1; JP Sho-64-51405 etc. The advantage of Ru-salt complex catalyst is its high catalytic activity in hydrogenation, with the drawback of comparatively low selectivity due to side reactions and gel formation. Therefore, there is a need for a catalyst system which has higher activity and lower price and results in no gel in the hydrogenation reaction.

In addition, U.S. Pat. No. 5,135,901 discloses a catalyst system for oxosynthesis. It consists of three components, namely Rh compound, Ru compound and a cocatalyst (or ligand). The patent describes to introduce the above three components, without catalyst preparation in advance, into the reaction vessel. The raw materials are ethylene oxide, CO and $H_2$ and the target product is either a β-hyroxypropaldehyde or a β-hydroxyl propionate.

It is an object of the present invention to provide a bimetallic complex catalyst system which is equal to conventional single Rh catalysts in activity and selectivity, but is much lower in cost.

It is another object of the present invention to provide a process for the preparation of the above mentioned bimetallic complex catalyst system.

It is a further object of the present invention to provide an improved hydrogenation process that can be carried out under mild conditions and free of gel formation.

It is still another object of the present invention to provide a hydrogenation process for unsaturated copolymers containing nitrile group besides carbon carbon double bond.

Other objects of the present invention can be apparent from the following detailed description.

SUMMARY OF THE INVENTION

The present invention provides bimetallic complex catalyst systems for the hydrogenation of unsaturated copolymers. The complex catalyst system has the empirical formula (1):

$$M^1_a M^2_b X_m (L_1)_n \qquad (1)$$

wherein $M^1$ is Rh or Ru, $M^2$ is Ru or a lanthanide, when $M^1$ is Rh, $M^2$ is Ru or a lanthanide, and when $M^1$ is Ru, $M^2$ is a lanthanide;

X is H, Cl, Br or the combinations thereof; $L_1$ is an organophosphine of the general formula $PR_1R_2R_3$ or diphosphane of the general formula $R_1R_2P(CH_2)_nPR_3R_4$, an organoarsine of the general formula $AsR_1R_2R_3$ or organic compounds containing N, S, O atoms or the combinations thereof, wherein $R_1$, $R_2$, $R_3$ and $R_4$ can be identical or different, and can be $C_1$–$C_6$ alkyl, $C_6$–$C_{12}$ cycloalkyl, aryl or $C_7$–$C_{12}$ aralkyl, or aryloxy group;

$1 \leq a \leq 4$, $1 \leq b \leq 2$, $3 \leq m \leq 6$, $6 \leq N \leq 15$.

The present invention also provides a process for the preparation of the above mentioned bimetallic complex catalyst system and an improved hydrogenation process for unsaturated copolymers, particularly for NBR type rubber, wherein a two-stage temperature reaction procedure is preferred.

DETAILED DESCRIPTION OF THE INVENTION

After extensive and intensive studies with a view to developing a catalyst system for the hydrogenation of the unsaturated copolymers which can get rid of the above mentioned drawbacks, the inventors have found a bimetallic complex catalyst system prepared by the reaction of two metal halides containing crystal water with a ligand $L_1$. Specifically the catalyst system according to the present invention can be prepared by reacting both $M^1$ and $M^2$ halides, preferably chlorides, wherein the mol ratio of $M^1$ to $M^2$ is from 1 to 4, and when $M^1$ is Rh or Ru, $M^2$ is Ru or a lanthanide respectively, with a ligand $L_1$ at the reflux temperature, and the filtering the reaction product or removing the solvent therefrom, and finally drying the resultant product. The mold ratio of $L_1$ to the sum of the halides is larger than 3, preferably from 6 to 12.

When the amount of this bimetallic (i.e. $M^1+M^2$) complex catalyst system used is equal to that of single Rh catalyst, the catalyst activity is identical in both cases. In other words, when unsaturated copolymers, particularly NBR type rubbers, are hydrogenated by using the bimetallic complex catalyst system according to the present invention, the hydrogenation rate is identical to that with the equal amount of single Rh complex catalyst. Therefore, the absolute Rh content is noticeably reduced and thus the cost is lowered.

The inventors have also found that the two-stage temperature reaction procedure enhances the catalytic activity and accordingly increases the hydrogenation rate for unsaturated copolymers, specifically for NBR type rubber. The present invention is completed on the basis of these discoveries.

The Complex Catalyst System

The bimetallic complex catalyst system according to the present invention has the following empirical formula:

$$M^1_a M^2_b X_m (L_1)_n$$

wherein $M^1$ is Rh or Ru, $M^2$ is Ru or a lanthanide, when $M^1$ is Rh, $M^2$ is Ru or a lanthanide, and when $M^1$ is Ru, $M^2$ is a lanthanide.

According to the present invention, the lanthanide includes lanthanum, cerium, praseodymium, neodymium, samarium, europium, gadolinium, terbium, dysprosium, holmium, erbium, thulium, ytterbium, lutetium. From the viewpoint of reduction of cost, the inexpensive lanthanide is preferred.

According to the present invention, X is H, Cl, Br or the combinations thereof, preferably X is Cl, H or the combination thereof and most preferably X is Cl.

According to the present invention, $L_1$ is a ligand that can form complexes with Rh, Ru or the lanthanide. $L_1$ is an organophosphine of the general formula $PR_1R_2R_3$, diphosphane of the general formula $R_1R_2P(CH_2)_nPR_3R_4$, an organoarsine of the general formula $AsR_1R_2R_3$ or organic compounds containing N, S, O atoms or the combinations thereof, wherein the groups $R_1$, $R_2$, $R_3$ and $R_4$ can be identical or different, and can be $C_1$–$C_6$ alkyl, $C_6$–$C_{12}$ cycloalkyl, aryl, $C_7$–$C_{12}$ aralkyl, or aryloxy groups.

Examples of $L_1$ include trimethyl phosphine, triethyl phosphine, triphenyl phosphine, triphenoxy phosphine, tri (p-methoxy phenyl)phosphine, diphenyl ethyl phosphine, 1,4-d-diphenyl phosphanobutane, 1,2-di-diphenyl phosphanoethane, triphenyl arsine, dibutyl phenyl arsine, diphenyl ethyl arsine, triphenyl amine, triethylamine, N,N-dimethylaniline, diphenyl thioether, dipropyl thioether, N,N'-tetramethylethylene diamine, acetylacetone, diphenylketone and mixtures thereof. $L_1$ is preferably selected from trimethylphosphine, triethylphosphine, triphenyl phosphine, triphenoxyphosphine, tri(p-methoxy phenyl) phosphine, diphenyl ethylphosphine, diphenyl thioether, dipropyl thioether, N,N'-tetramethylethylene diamine, 1,4-d-diphenyl phosphanobutane, 1,2-di-diphenyl phosphanoethane and mixtures thereof, and more preferably triphenylphosphine.

According to the present invention, $1 \leq a \leq 4$, $1 \leq b \leq 2$, i.e. a/b is equal to or larger than 1 and equal to or smaller than 4. If a/b is smaller than 1, the complex catalyst system can not attain the desired activity, and specifically for Rh-Ru bimetallic complex catalyst system, when it is applied to the hydrogenation of NBR type rubber, gel formation is observed. If a/b is larger than 4, the effect of cost saving is not noticeable, most preferred is a/b=2~1:1.

According to the present invention, $3 \leq m \leq 6$, and $6 \leq n \leq 15$.

Preparation of the Complex Catalyst System

The present invention provides a method for the preparation of the mentioned bimetallic complex catalyst system wherein two metal halides selected from Rh, Ru or a lanthanide (such as La, Ce) halides (containing crystal water), preferably chlorides containing crystal water, are reacted with $L_1$ in a solvent at the reflux temperature 0.5 to 2.0 hrs.

Specifically, in the process for the preparation of the complex catalyst system according to the present invention, the mol ratio of $RhX_3 \cdot 3H_2O$ to $RuX_3 \cdot nH_2O$ or $LaX_3 \cdot nH_2O$ (e.g. $LaX_3 \cdot nH_2O$ or $CeX_3 \cdot nH_2O$), or of $RuX_3 \cdot nH_2O$ to $LaX_3 \cdot nH_2O$ (e.g. $LaX_3 \cdot nH_2O$ or $CeH_3 \cdot nH_2O$) is from 1 to 4, wherein X is halogen, preferably Cl. The solution of either pair of the two metal chlorides mentioned above is reacted with $L_1$ at the reflux temperature for a period of time and then the catalyst (precipitate) is obtained by filtration or solvent removal and is finally dried. The mol ratio of $L_1$ to the sum of the two metal halides of Rh, Ru and a lanthanide (e.g. La, Ce), i.e. $L_1:(M^1+M^2)$ is larger than $^3$, preferably from 6 to 12. The mol ratio of $RhX_3 \cdot 3H_2O$ to $RuX_3 \cdot 3H_2O$ or to a $LaX_3 \cdot nH_2O$ (e.g. $LaX_3 \cdot nH_2O$ or $CeX_3 \cdot nH_2O$) is preferably from 1 to 2.

The solvent used in the present invention should dissolve both $MeX_3 \cdot nH_2O$ and $L_1$, and can be alkanols (such as absolute ethanol, or 95% ethanol), ethers (such as diethyl ether), ketones (such as acetone, butanone), aromatics (such as benzene) and the mixtures thereof.

The Process for the Hydrogenation of Unsaturated Copolymers

The present invention also provides a process for the hydrogenation of unsaturated copolymers using the complex catalyst system mentioned above.

The process involves dissolving the unsaturated copolymer in a solvent, adding this solution into a reaction vessel, repeatedly pumping up the vessel with highly pure $H_2$ and evacuating the vessel, adding the catalyst solution, and pumping up again with highly pure $H_2$, stirring and heating up the vessel content to a predetermined temperature. The characteristic of this process is that the complex catalyst system used is the bimetallic complex catalyst system according to the present invention.

In the process according to the present invention, the hydrogenation temperature used is from 40 to 180° C., preferably from 80 to 160° C.

In the process according to the present invention, the reaction is conducted by using a two-stage temperature reaction procedure, the first stage is from 80 to 130° C. for 1 to 4 hrs. and the second stage is from 130 to 160° C. for another 1 to 4 hrs.

According to the process of the present invention, the result of two-stage temperature reaction procedure is better than that of one stage temperature reaction procedure.

The bimetallic complex catalyst system according to the present invention is preferably the bimetallic complex catalyst system from the combination of Rh and Ru. If only single $RuCl_2(PPh_3)_3$ is employed for hydrogenation, the gel formation is observed, while the gel formation is not observed with the bimetallic complex catalyst system (wherein Rh:Ru$\geq$1).

The hydrogenation catalytic activity of the bimetallic complex catalyst system from the combination of Ru and a lanthanide (such as Ce) is higher in comparison with that of a single Ru complex catalyst.

According to the process of the present invention, the amount of the bimetallic complex catalyst system is from 0.01 to 10% by weight based on the copolymer, preferably from 0.1 to 5% and more preferably from 0.1 to 2% by weight based on the copolymer.

According to the process of the present invention, the $H_2$ pressure ranges from 0.05 to 5 MPa, preferably from 0.1 to 1.5 MPa. and the highly pure $H_2$ is required.

According to the process of the present invention, a second ligand $L_2$ is needed in the hydrogenation reaction, and it plays the role of stabilizing the complex catalyst system. $L_2$ can be identical with or different from the first ligand $L_1$, preferably it is identical with $L_1$ and selected from phosphine($PR_1R_2R_3$), diphosphane($R_1R_2P(CH_2)_nPR_3R_4$), arsine ($AsR_1R_2R_3$) or organic compounds containing N, S, O atoms or the mixtures thereof.

The examples of $L_2$ is identical with L. The weight ratio of $L_2$ to the complex catalyst system is from 0.5:1 to 20:1, preferably from 1:1 to 3:1.

In the process according to the present invention, the solvent used should dissolve the raw unsaturated copolymer, the complex catalyst system and $L_2$.

The solvent can be selected from aromatics, alkyl or halogen substituted aromatics, haloalkanes, ketones, cycloalkanes, amides and the mixtures thereof. Specifically, the solvents used in the present invention are benzene, toluene, xylene, chlorobenzene, o-dichlorobenzene, trichlorobenzene, dichloroethane, cyclohexane, acetone, butanone, N,N-dimethylformamide, N,N-dimethylacetamide and the mixtures thereof, preferably xylene, chlorobenzene and the mixtures thereof.

In the process according to the present invention, the unsaturated copolymers are selected from butadiene-(meth)acrylanitrile, 2-methyl-1,3-butadiene-(meth)acrylonitrile, poly(styrene-b-butadiene-b-styrene) (SBS), preferably butadiene-acrylonitrile copolymer (NBR); and terpolymers, selected from butadiene-(meth)acrylonitrile-(meth) acrylic acid, butadiene-(meth)acrylonitrile-[N-(4-anilinophenyl)methacrylamide], preferably butadiene-acrylonitrile-(meth) acrylic acid terpolymer (carboxyl-NBR) and the molecular weight of the raw unsaturated copolymer is not critical.

The concentration of polymer is between 1~20 g of polymer/100 ml solvent, preferably from 1 to 10 g of polymer/100 ml of solvent.

In general, the time for hydrogenation is from 1 to 20 hrs, preferably from 2 to 10 hrs.

The complex catalyst system according to the present invention is used in homogenous hydrogenation process but can also be modified by well known methods in the art so as to be used in heterogeneous hydrogenation process.

The complex catalyst system according to the present invention is preferably applied to the hydrogenation of unsaturated copolymers containing nitrile group, more preferably to the homogenous hydrogenation of NBR.

Definition of Hydrogernation Rate and the Method for Unsaturation Determination

Hydrogenation rate =

$$\frac{\text{unsaturation of copolymer before hydrogenation} - \text{unsaturation after hydrogenation}}{\text{unsaturation of copolymer before hydrogenation}} \times 100\%$$

Degree of saturation=100%−degree of unsaturation

Degree of unsaturation can be determined by bromo-iodometry according to GB-1676-81 (Chinese National Standard) and $^1$H-NMR method, see A. J. Marshall et al., Rubber Chemistry and Technology, 63, 244 (1990).

In the present invention, the bromo-iodometry is employed for the unsaturation determination according to GB-1678-81, except that $CHCl_3$ is used as solvent for polymers and bromo-iodometry reagent is used instead of iodine.

The following examples are intended to illustrate the present invention but not for restriction of the scope of the present invention. All percentage and parts used herein are by weight unless otherwise indicated.

Preparation Examples of Complex Catalyst Systems

EXAMPLE 1-1

First, 3.12 g (12 mmol) of $PPh_3$ and a certain amount of absolute ethanol are added into a vessel equipped with a stirrer, a reflux condenser and placed in a thermostatic bath. The stirrer is then started and the vessel is heated up for the dissolution of $PPh_3$. Then 0.26 g (1 mmol) of $RhCl_3 \cdot 3H_2O$ and 0.23 g (1 mmol) of $RuCl_3 \cdot xH_2O$ are mixed and dissolved in the absolute ethanol and the resultant solution is added to the reaction vessel and reacted at reflux temperature for 2 hrs. Catalyst A is thus obtained wherein Rh:Ru= 1:1 (mol ratio).

EXAMPLE 1-2

The procedure and reaction conditions are identical to those described in Example 1-1, except that 1.5 mmol, 2 mmol, 2.5 mmol, 3.0 mmol, 4.0 mmol of $RhCl_3 \cdot 3H_2O$ is used to react with 1 mmol $RuCl_3 \cdot xH_2O$ respectively, to obtain catalyst B wherein Rh:Ru=1.5:1 (mol ratio); catalyst C wherein Rh:Ru=2:1 (mol ratio); catalyst D wherein Rh:Ru=3:1 (mol ratio); catalyst E wherein Rh:Ru=2.5:1 (mol ratio); and catalyst F wherein Rh:Ru=4:1 (mol ratio).

EXAMPLE 1-3

Catalysts G wherein Rh:Ce=1:1 (mol ratio); H wherein Rh:Ce=2:1 (mol ratio); I wherein Rh:Ce=4:1 (mol ratio) and J wherein Ru:Ce=2:1 (mol ratio); and K wherein Rh:La=1:1 (mol ratio) are prepared according to the procedure described in Example 1-1.

Hydrogenation of Unsaturated Copolymers
The Process for Hydrogenation

A 50 ml solution of Nancar 1052 with acrylonitrile content of 33% (a NBR from NANTEX Industry Co. Ltd., with the concentration of 7 g of Nancar 1052/100 ml of xylene solvent) is charged into a stainless vessel of 0.1 L capacity, whereupon it is tightly closed. The vessel was repeatedly charged with highly pure $H_2$ and evacuated. Chlorobenzene solution of catalyst with different ratios of $M^1$ to $M^2$ and the second ligand $L_2$ are charged together to the vessel, wherein the amount of $L_2$ is two times that of the catalyst by weight. After charging, again the vessel is pumped up with highly pure $H_2$, the stirrer is started and the vessel is heated up to a predetermined temperature. The hydrogenation is followed by $H_2$-pressure drop in the vessel and $H_2$ is introduced repeatedly to maintain the predetermined $H_2$-pressure. After the reaction is completed, the content of the vessel is discharged and coagulated with ethanol or hot water or by steam distillation. The target product is finally separated and dried at 60° C. to constant weight.

The hydrogenation rate and degree of unsaturation is determined by bromo-iodometric method.

EXAMPLE 2-1

The above mentioned process for hydrogenation is conducted under the conditions described in Table 1 and with triphenyl phosphine as $L_2$. The results are listed in Table 1.

TABLE 1

| Items Runs | Catalyst system | Catalyst amount, wt. % | Reaction temperature -time, °C.-hrs | $H_2$ pressure, Mpa | Hydrogenation rate, % |
|---|---|---|---|---|---|
| 1 | D | 0.42 | 120-4.0 | 0.8 | 96.2 |
| 2 | D | 0.40 | 145-4.0 | 0.8 | 98.5 |
| 3 | D | 0.30 | 145-4.0 | 0.8 | 95.1 |

COMPARATIVE EXAMPLE 2-1

The above mentioned process for hydrogenation is conducted under the conditions described in Table 2 and with triphenyl phosphine as $L_2$. The results are listed in Table 2.

TABLE 2

| Items Runs | Catalyst system | Catalyst amount, wt. % | Reaction temperature -time, °C.-hrs | $H_2$ pressure, Mpa | Hydrogenation rate, % |
|---|---|---|---|---|---|
| 1 | $RhCl(PPh_3)_3$ | 0.42 | 120-4.0 | 0.8 | 96.6 |
| 2 | $RhCl(PPh_3)_3$ | 0.29 | 145-4.0 | 0.8 | 94.2 |
| 3* | $RhCl(PPh_3)_3$ | 1.0 | 140-4.0 | 0.8 | 46.2 |

*A large amount of coagulum and gel is formed.

The method for the preparation of $RhCl(PPh_3)_3$ and $RuCl_2(PPh_3)_3$ are referred to Editor-in-chief L. Muetterties, Inorganic Syntheses vol. 10, pp. 66–71, (1967); Editor-in-chief Robert W. Parry, Inorganic Syntheses vol. 12, pp. 237–240, (1970).

From Runs 1 and 3 in Example 2-1 and Runs 1 and 2 in Comparative Example 2-1, it can be seen that when the total amount of catalysts is identical, the catalytic activity of the complex catalyst systems according to the present invention is identical to that of the single Rh-complex catalyst. However, since in the present invention, part of Rh is substituted by Ru, the catalyst cost is markedly saved. In addition, no gel is found in the hydrogenation products.

EXAMPLE 2-2

The above mentioned process for hydrogenation is conducted under the conditions described in Table 3 and with triphenyl phosphine as $L_2$, and two-stage temperature reaction procedure is adopted, the total time of reactions is 4 hrs. The results are listed in Table 3.

TABLE 3

| Items Runs | Catalyst system | Catalyst amount, wt. % | Reaction temperature -time, °C.-hrs | $H_2$ pressure, Mpa | Hydrogenation rate, % |
|---|---|---|---|---|---|
| 1 | F | 0.40 | 110-2.5,145-1.5 | 0.8 | 98.3 |
| 2 | F | 0.42 | 110-2.5,145-1.5 | 0.8 | 99.0 |
| 3 | F | 0.45 | 110-2.5,145-1.5 | 0.8 | 99.1 |
| 4 | D | 0.29 | 110-2.0,160-2.0 | 0.8 | 97.6 |
| 5 | D | 0.29 | 125-2.5,155-1.5 | 0.8 | 98.5 |
| 6 | D | 0.29 | 125-2.5,145-1.5 | 0.8 | 97.8 |
| 7 | D | 0.40 | 110-2.5,145-1.5 | 0.4 | 93.1 |
| 8 | D | 0.40 | 110-2.5,130-1.5 | 0.4 | 90.8 |
| 9 | D | 0.42 | 110-2.5,145-1.5 | 0.8 | 98.7 |
| 10 | E | 0.42 | 110-2.5,145-1.5 | 0.8 | 98.5 |
| 11 | C | 0.42 | 110-2.5,145-1.5 | 0.8 | 97.1 |
| 12 | A | 0.42 | 110-2.5,145-1.5 | 0.8 | 96.3 |

COMPARATIVE EXAMPLE 2-2

The above mentioned process for hydrogenation is conducted under the conditions described in Table 4 and with triphenyl phosphine as $L_2$. The results are listed in Table 4.

TABLE 4

| Items Runs | Catalyst system | Catalyst amount, wt. % | Reaction temperature -time, ° C.$^{-hrs}$ | H$_2$ pressure, Mpa | Hydrogenation rate, % |
| --- | --- | --- | --- | --- | --- |
| 1 | RhCl(PPh$_3$)$_3$ | 0.29 | 125-2.5,145-1.5 | 0.8 | 97.4 |
| 2 | RhCl(PPh$_3$)$_3$ | 0.29 | 110-2.5,145-1.5 | 0.8 | 96.7 |
| 3 | RhCl$_2$(PPh$_3$)$_3$ | 0.17 | 110-2.0, 160-2.0 | 0.8 | 91.7 |

From the results of Run 6 in Example 2-2 and Run 1 in the Comparative Example 2-2, it can be seen that with the same amount of catalyst used and when other conditions were identical, the activity of the catalyst system according to the present invention is identical to that of single Rh-catalyst. In other words, while the activity of the catalysts is identical, the absolute quantity of Rh used in the present invention is lower than that of single Rh-catalyst. Consequently, the cost is reduced.

In addition, from the results of Runs 4–6 in Table 3 and Run 3 in Table 1, it can also be found that two stage temperature reaction procedure adopted in the present invention shows the advantage of increasing hydrogenation rate.

EXAMPLE 3-1

The above mentioned process for hydrogenation is conducted under the conditions described in Table 5 and with triphenyl phosphine as L$_2$. The results are listed in Table 5.

From table 5 and table 6, it can be seen that when the absolute amount of total catalyst used in the two examples are identical, the activity of the catalyst system according to the present invention is identical to that of the single Rh-catalyst.

From the results of Run 3 in Table 2, Runs 7 and 8 in Table 5, and Run 5 in Table 6, it can also be seen that when the amount of Ru is identical in those cases, the catalytic activity of the catalyst system according to the present invention is higher than that of the single Ru-catalyst, and that of the sum of hydrogenation rate from single Ce and Ru catalysts, the increase in the catalytic activity of bimetallic catalyst system can possibly be ascribed to the synergistic effect between two metal complexes, and no gel formation is found.

EXAMPLE 4-1

The hydrogenation of NBR with different acrylonitrile content.

The above mentioned process for hydrogenation is conducted under the conditions described in Table 7 and with

TABLE 5

| Items Runs | Catalyst system | Catalyst amount, wt. % | Reaction temperature -time, ° C.$^{-hrs}$ | H$_2$ pressure, Mpa | Hydrogenation rate, % |
| --- | --- | --- | --- | --- | --- |
| 1 | I | 0.45 | 110-4.0 | 0.8 | 98.4 |
| 2 | H | 0.45 | 110-4.0 | 0.8 | 97.6 |
| 3 | G | 0.45 | 110-4.0 | 0.8 | 95.7 |
| 4 | K | 0.45 | 110-4.0 | 0.8 | 95.6 |
| 5 | K | 0.48 | 110-4.0 | 0.8 | 97.0 |
| 6 | K | 0.48 | 110-2.5,130-1.5 | 0.8 | 98.8 |
| 7 | J | 1.60 | 120-2.5,145-4.0 | 0.8 | 79.2 |
| 8 | J | 1.60 | 145-5.5 | 0.8 | 68.3 |

COMPARATIVE EXAMPLE 3-1

The above mentioned process for hydrogenation is conducted under the conditions described in Table 6 and with triphenyl phosphine as L$_2$. The results are listed in Table 6.

triphenyl phosphine as L$_2$. The raw copolymers used in Nancar 1051 from NANTEX Industry Co., Ltd., with a acrylonitrile content of 41% and Nancar 6004 from NANTEX Industry Co. Ltd, with a acrylonitrile content of 19%. The results are listed in Table 7.

TABLE 6

| Items Runs | Catalyst system | Catalyst amount, wt. % | Reaction temperature -time, ° C.$^{-hrs}$ | H$_2$ pressure, Mpa | Hydrogenation rate, % |
| --- | --- | --- | --- | --- | --- |
| 1 | RhCl(PPh$_3$)$_3$ | 0.42 | 120-4.0 | 0.8 | 96.6 |
| 2 | RhCl(PPh$_3$)$_3$ | 0.30 | 110-4.0 | 0.8 | 90.7 |
| 3 | RhCl(PPh$_3$)$_3$ | 0.55 | 110-4.0 | 0.8 | 98.8 |
| 4 | RhCl(PPh$_3$)$_3$ | 0.22 | 110-4.0 | 0.8 | 80.5 |
| 5 | CeCl(PPh$_3$)$_n$ | 0.80 | 110-4.0 | 0.8 | 5.9 |
| 6 | LaCl(PPh$_3$)$_n$ | 0.80 | 110-4.0 | 0.8 | 9.7 |

TABLE 7

| NBR TYPES | Catalyst system | Catalyst amount, at. % | Reaction temperature -time, °C.$^{-hrs}$ | $H_2$ pressure Mpa | Hydrogenation rate, % |
|---|---|---|---|---|---|
| 1051 | D | 0.50 | 110-2.5,145-1.5 | 0.8 | 97.7 |
| (Chlorobenzene) | C | 0.50 | 110-2.5,145-1.5 | 0.8 | 97.7 |
| | B | 0.50 | 140-2.5,145-1.5 | 0.8 | 96.8 |
| 6004 | B | 0.50 | 110-2.5,145-1.5 | 0.8 | 93.6 |
| (xylene) | B | 0.35 | 110-2.5,145-1.5 | 0.8 | 91.5 |
| | B | 0.35 | 120-2.0,145-2.0 | 0.8 | 92.0 |
| | B | 0.35 | 120-2.0,160-2.0 | 0.8 | 93.0 |

Single Rh complex catalyst, such as $RhCl(PPh_3)_3$, is a highly active, highly selective catalyst for hydrogenation, but the raw materials $RhCl_3 \cdot 3H_2O$ is very expensive, while the new catalyst system according to the present invention is employed at the identical catalyst concentration, the same hydrogenation rate is reached as that of single Rh-complex catalyst does. Consequently Rh is saved and the cost is markedly reduced.

All above mentioned examples are of illustrative character, if a proper modification is made, such as $M^1:M^2$ ratio from 5:1 to 10:1, they still fall within the scope of the claims of the present invention.

What is claimed is:

1. A bimetallic complex catalyst system for the selective hydrogenation of carbon carbon double bond (C=C) in unsaturated copolymers, having the following empirical formula:

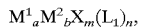

$$M^1{}_a M^2{}_b X_m (L_1)_n,$$

wherein $M^1$ is rhodium (Rh) or ruthenium (Ru), $M^2$ is ruthenium (Ru) or a rare earth metals of the lanthanum group (lanthanide); when $M^1$ is rhodium (Rh), $M^2$ is ruthenium (Ru) or a rare earth metal of the lanthanum group (lanthanide); and when $M^1$ is ruthenium (Ru), $M^2$ is a rare earth metal of the lanthanum group (lanthanide);

X is H, Cl, Br or the combinations thereof;

$L_1$ is organophosphine ($PR_1R_2R_3$), diphosphane ($R_1R_2P(CH_2)_nPR_3R_4$), organoarsine ($AsR_1R_2R_3$) or organic compounds containing N, S, O atoms or mixtures thereof, the groups $R_1$, $R_2$, $R_3$ and $R_4$ are either identical or different, and are $C_1$~$C_6$ alkyl, $C_6$~$C_{12}$ cycloalkyl, aryl, $C_7$~$C_{12}$ aralkyl, or aryloxy groups;

$1 \leq a \leq 4$;
$1 \leq b \leq 2$;
$3 \leq m \leq 6$; and
$6 \leq n \leq 15$.

2. The bimetallic complex catalyst system of claim 1, wherein $M^1$ is Rh, $M^2$ is Ru.

3. The bimetallic complex catalyst system of claim 1, wherein $M^2$ is a lanthanide.

4. The bimetallic complex catalyst system of claim 3, wherein $M^2$ is Ce or La.

5. The bimetallic complex catalyst system of claim 1, wherein X is H, Cl, Br or the combinations thereof.

6. The bimetallic complex catalyst system of claim 1, wherein X is H, Cl.

7. The bimetallic complex catalyst system of claim 1, wherein $L_1$ is selected from trimethyl phosphine, triethyl phosphine, triphenyl phosphine, triphenoxy phosphine, tri-(p-methoxy phenyl) phosphine, diphenyl ethyl phosphine, 1,4-di-diphenyl phosphanobutane, 1,2-di-diphenyl phosphanoethane, triphenyl arsine, dibutyl phenyl arsine, diphenyl ethyl arsine, triphenyl amine, triethyl amine, N, N-dimethyl aniline, diphenyl thioether, dipropyl thioether, N, N'-tetramethyl ethylene diamine, acetylacetone, diphenyl ketone and mixtures thereof.

8. The bimetallic complex catalyst system of claim 7, wherein $L_1$ is selected from trimethylphosphine, triethylphosphine, triphenylphosphine, triphenoxyphosphine, tri-(p-methoxyphenyl)phosphine, diphenyl ethyl phosphine, N, N'-tetramethyl ethylene diamine, 1,4-di-diphenyl phosphanobutane, 1,2-di-diphenyl phosphanoethane, diphenyl thioether, dipropyl thioether and mixtures thereof.

9. The bimetallic complex catalyst system of claim 8, wherein $L_1$ is triphenyl phosphine.

10. A process for preparing the bimetallic complex catalyst system of claim 1, comprising the steps of:
    (1) adding $L_1$ together with a solvent into a reaction vessel, dissolving and mixing them by stirring under reflux condition;
    (2) mixing and dissolving the halides of $M^1$ and $M^2$ in a hot solvent and adding the resultant solution into the reaction vessel; and
    (3) removing the solvent and subsequently drying the resultant crystallines or powder.

11. The process of claim 10, wherein the halides of $M^1$ and $M^2$ are the metal halides containing crystal water, the mol ratio of $M^1$ to $M^2$ is from 1 to 4; the mol ratio of $L_1$ to the total metal ($M^1+M^2$) halides is larger than 3, the solvent can dissolve all $M^1$, $M^2$ and $L_1$, and is selected from alkanols, ethers, aromatics, ketones and mixtures thereof.

12. The process of claim 10, wherein the mol ratio of $M^1$ to $M^2$ is from 1 to 2; the mol ratio of $L_1$ to the total metal ($M^1+M^2$) halides is from 6 to 12; and the solvent is absolute ethanol, 95% ethanol, ethyl ether, benzene, acetone or butanone.

13. The process of claim 12, wherein the solvent is absolute ethanol.

14. A process for the hydrogenation of unsaturated copolymer, comprising the steps of:
    (1) adding the unsaturated copolymer solution into a reaction vessel, repeatedly pumping up with the highly pure $H_2$ and evacuating the vessel;
    (2) adding the catalyst system of claim 1 and a second ligand $L_2$ into the vessel;
    (3) pumping up the vessel with the highly pure $H_2$, and heating up the contents of the vessel with stirring at a reaction temperature ranging from 40 to 180° C. and a hydrogen pressure ranging from 0.05 to 5 Mpa for 1 to 20 hrs; wherein the amount of the complex catalyst system is from 0.01 to 10% by weight based on the copolymer; and (4) coagulating the resultant hydrogenated product with ethanol or hot water or by steam distillation, separating and drying.

15. The process of claim 14, wherein the unsaturated copolymer is a copolymer selected from butadiene-(meth) acrylonitrile; 2-methyl-1,3-butadiene-(meth)acrylonitrile; poly)styrene-b-butadiene-b-styrene) (SBS); and a terpolymer selected from butadiene-(meth)acrylonitrile-(meth) acrylicacid; butadiene-(meth)acrylonitrile-[N-(4-anilinophenyl) methacrylamide].

16. The process of claim 15, wherein the unsaturated copolymer is butadiene-acrylonitrile copolymer (NBR) or carboxyl nitrile rubber.

17. The process of claim 16, wherein the unsaturated copolymer is butadiene-acrylonitrile copolymer (NBR).

18. The process of claim 14, wherein the reaction is a homogeneous one.

19. The process of claim 14, wherein the hydrogen used is highly pure hydrogen and $H_2$ pressure is from 0.05 to 5 MPa, and the reaction temperature ranges from 40 to 180° C.

20. The process of claim 19, wherein $H_2$ pressure is from 0.1 to 1.5 Mpa, and the reaction temperature is from 80 to 160° C.

21. The process of claim 19, wherein the reaction is conducted in a two-stage temperature reaction procedure, the first stage ranging from 80 to 130° C. for 1~4 hrs. and the second ranging from 130 to 160° C. for another 1~4 hrs.

22. The process of claim 14, wherein the concentration of the complex catalyst system ranges from 0.01 to 5% by weight based on the copolymer.

23. The process of claim 22, wherein the concentration of the complex catalyst system is from 0.1 to 2% by weight based on the copolymer.

24. The process of claim 14, wherein the second ligand $L_2$ is same as or different from $L_1$ and has the same scope as $L_1$, the ratio of $L_2$ to the complex catalyst system (by weight) ranges from 0.5:1 to 20:1.

25. The process of claim 24, wherein the ratio of $L_2$ to the complex catalyst system ranges from 0.5:1 to 10:1.

26. The process of claim 14, wherein the concentration of the copolymer is from 1 to 20 g per 100 ml of solvent.

27. The process of claim 14, wherein the solvent can dissolve all the copolymers, the complex catalyst system and the second ligand $L_2$, and is selected from aromatics, alkyl or halogen substituted aromatics, haloalkanes, ketones, amides and mixtures thereof.

28. The process of claim 27, wherein the solvent is selected from benzene, toluene, xylene, chlorobenzene, o-dichlorobenzene, trichlorobenzene, dichloroethane, cyclohexane, acetone, butanone, N,N-dimethylformamide, N,N-dimethyl acetamide and mixtures thereof.

29. The process of claim 28, wherein the solvent is xylene, chlorobenzene or mixture thereof.

* * * * *